US012122621B2

(12) United States Patent
Katz
(10) Patent No.: US 12,122,621 B2
(45) Date of Patent: Oct. 22, 2024

(54) ROLL TO ROLL WEB PROCESSING SYSTEM

(71) Applicant: Orbotech Ltd., Yavne (IL)

(72) Inventor: Asher Katz, Tel Aviv (IL)

(73) Assignee: Orbotech Ltd., Yavne (IL)

( * ) Notice: Subject to any disclaimer, the term of this patent is extended or adjusted under 35 U.S.C. 154(b) by 521 days.

(21) Appl. No.: 17/425,311

(22) PCT Filed: Jan. 14, 2020

(86) PCT No.: PCT/IL2020/050052
§ 371 (c)(1),
(2) Date: Jul. 22, 2021

(87) PCT Pub. No.: WO2020/152670
PCT Pub. Date: Jul. 30, 2020

(65) Prior Publication Data

US 2022/0097990 A1 Mar. 31, 2022

Related U.S. Application Data

(60) Provisional application No. 62/795,035, filed on Jan. 22, 2019.

(51) Int. Cl.
*B65H 18/10* (2006.01)
*B41J 15/16* (2006.01)
(Continued)

(52) U.S. Cl.
CPC ............ *B65H 18/103* (2013.01); *B41J 15/16* (2013.01); *B65H 20/005* (2013.01); *B65H 23/00* (2013.01); *B65H 2403/72* (2013.01)

(58) Field of Classification Search
CPC .... B65H 18/103; B65H 20/005; B65H 23/00; B65H 2403/72; B41J 15/16; B41J 3/407
(Continued)

(56) References Cited

U.S. PATENT DOCUMENTS 3,759,432 A 9/1973 Hutzenlaub
6,402,077 B1 * 6/2002 Vargo ................ B29D 30/0016 242/538
(Continued)

FOREIGN PATENT DOCUMENTS

CN 102700236 A 10/2012
EP 2990365 A1 4/2020
(Continued)

OTHER PUBLICATIONS

TIPO, Office Action for TW Application No. 108148192, May 2, 2023 (see X/Y/A designations on p. 10).
(Continued)

*Primary Examiner* — William A. Rivera
(74) *Attorney, Agent, or Firm* — Hodgson Russ LLP

(57) ABSTRACT

A roll-to-roll web processing system including a web supply roller operative for supplying web material, at least one upstream intermediate roller for receiving the web material from the web supply roller and directing the web material along at least a first web pathway portion, a processing subsystem arranged along at least a second web pathway portion, at least one downstream intermediate roller for receiving the web material from the processing subsystem and directing the web material along a third web pathway portion, and a web take up roller operative for taking up the web material, the first, second and third web pathway portions at least partially delimiting an internal volume interior of the at least one upstream intermediate roller, the processing subsystem and the at least one downstream intermediate roller and the web supply roller and the web take up roller being located in the internal volume.

18 Claims, 2 Drawing Sheets

(51) Int. Cl.
*B65H 20/00* (2006.01)
*B65H 23/00* (2006.01)

(58) Field of Classification Search
USPC ........................................... 242/419.9, 420.4
See application file for complete search history.

(56) References Cited

U.S. PATENT DOCUMENTS

| | | | | |
|---|---|---|---|---|
| 8,925,852 | B2 * | 1/2015 | Nakada | B65H 23/182 242/420.4 |
| 10,252,874 | B2 * | 4/2019 | Lim | B65H 5/06 |
| 2015/0203314 | A1 * | 7/2015 | Vigren | C23C 14/562 242/534 |
| 2018/0041383 | A1 * | 2/2018 | Haque | B65H 23/04 |
| 2018/0127227 | A1 * | 5/2018 | Nishimura | B65H 35/02 |
| 2019/0062095 | A1 * | 2/2019 | Kudo | B65H 29/12 |
| 2019/0315136 | A1 * | 10/2019 | Amari | B65H 18/103 |
| 2019/0344586 | A1 * | 11/2019 | Kawai | B65H 23/26 |
| 2022/0144574 | A1 * | 5/2022 | Murashige | B65H 18/103 |

FOREIGN PATENT DOCUMENTS

| | | | |
|---|---|---|---|
| JP | H04316044 | A | 11/1992 |
| JP | 2005112625 | A | 4/2005 |
| JP | 2012171704 | A | 9/2012 |
| JP | 2017138415 | A | 8/2017 |
| JP | 2017524626 | A | 8/2017 |
| TW | 200622520 | A | 7/2006 |
| TW | 201820948 | A | 6/2018 |
| TW | 201841723 | A | 12/2018 |
| WO | 2011049567 | A1 | 4/2011 |
| WO | 2018224366 | A1 | 12/2018 |

OTHER PUBLICATIONS

U.S. Department of Energy, Roll to Roll (R2R) Processing Technology Assessment, 2015, pp. 1-36.
Wipo, International Search Report for International Application No. PCT/IL2020/050052, Apr. 21, 2020.
Tipo, Office Action issued for TW Application No. 108148192, May 13, 2024. See X/Y/A references at p. 9 of the Office Action.
JPO, Office Action issued for JP Application No. 2021-543328, Jan. 16, 2024.
Maxcess, Great-Expansion Shaft, Sep. 27, 2023, https://www.maxcessintl.com/product/winding-systems/standard-core-shafts/great-expansion-shaft/.
Maxcess, Magpowr B-7V and B-20V Vertical Magnetic Particle Brakes, Jan. 30, 2019, http://www.maxcessintl.com/magnetic-particle-clutches-and-brakes/magpowr-b-7v-and-b-20v-vertical-magnetic-particle-brakes.
Maxcess, Webex Inc. Products, Jan. 3, 2019, https://www.maxcessintl.com/webex/.
Maxcess, Tension Control, Apr. 13, 2021, https://www.maxcessintl.com/products/tension-controls/.
Maxcess, Fife, Dec. 28, 2018, https://www.maxcessintl.com/fife/.
KIPO, Office Action issued for KR Application No. 10-2021-7026595, Jul. 26, 2024.

* cited by examiner

ROLL TO ROLL WEB PROCESSING SYSTEM

FIELD OF THE INVENTION

The present invention relates to roll-to-roll web processing systems generally.

BACKGROUND OF THE INVENTION

Various types of roll-to-roll web processing systems are known.

SUMMARY OF THE INVENTION

The present invention seeks to provide a roll-to-roll web processing system which is particularly compact.

There is thus provided in accordance with a preferred embodiment of the present invention a roll-to-roll web processing system including a web supply roller operative, when rotated in a first direction of rotation, for supplying web material, at least one upstream intermediate roller for receiving the web material from the web supply roller and directing the web material along at least a first web pathway portion, a processing subsystem arranged along at least a second web pathway portion, angled with respect to the first web pathway portion, at least one downstream intermediate roller for receiving the web material from the processing subsystem and directing the web material along a third web pathway portion, angled with respect to the second web pathway portion, and a web take up roller operative, when rotated in a second direction of rotation, for taking up the web material, the first, second and third web pathway portions at least partially delimiting an internal volume interior of the at least one upstream intermediate roller, the processing subsystem and the at least one downstream intermediate roller and the web supply roller and the web take up roller being located in the internal volume.

In accordance with a preferred embodiment of the present invention the roll-to-roll web processing system forms part of a flexible printed circuit board (PCB) production line. Additionally, the web material is a flexible PCB substrate.

In accordance with a preferred embodiment of the present invention the web take up roller is driven by a motor, preferably a stepper motor or a servo motor. Additionally or alternatively, the web supply roller is passive and is operatively associated with a clutch.

Preferably, the roll-to-roll web processing system also includes a web material tension control sub-system. Additionally, the web material tension control sub-system includes a clutch, at least one load cell and a controller.

Preferably, the roll-to-roll web processing system also includes at least one web material alignment control sub-system. Additionally, the at least one web material alignment control sub-system includes a sensor, an actuator and a controller.

In accordance with a preferred embodiment of the present invention the at least one upstream intermediate roller includes first and second upstream intermediate rollers. Additionally, the first and second upstream intermediate rollers define the first web pathway portion therebetween.

In accordance with a preferred embodiment of the present invention the second web pathway portion is perpendicular to the first web pathway portion.

Preferably, the at least one downstream intermediate roller includes first and second downstream intermediate rollers. Additionally, the first and second downstream intermediate rollers define the third web pathway portion therebetween.

In accordance with a preferred embodiment of the present invention the third web pathway portion is perpendicular to the second web pathway portion.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
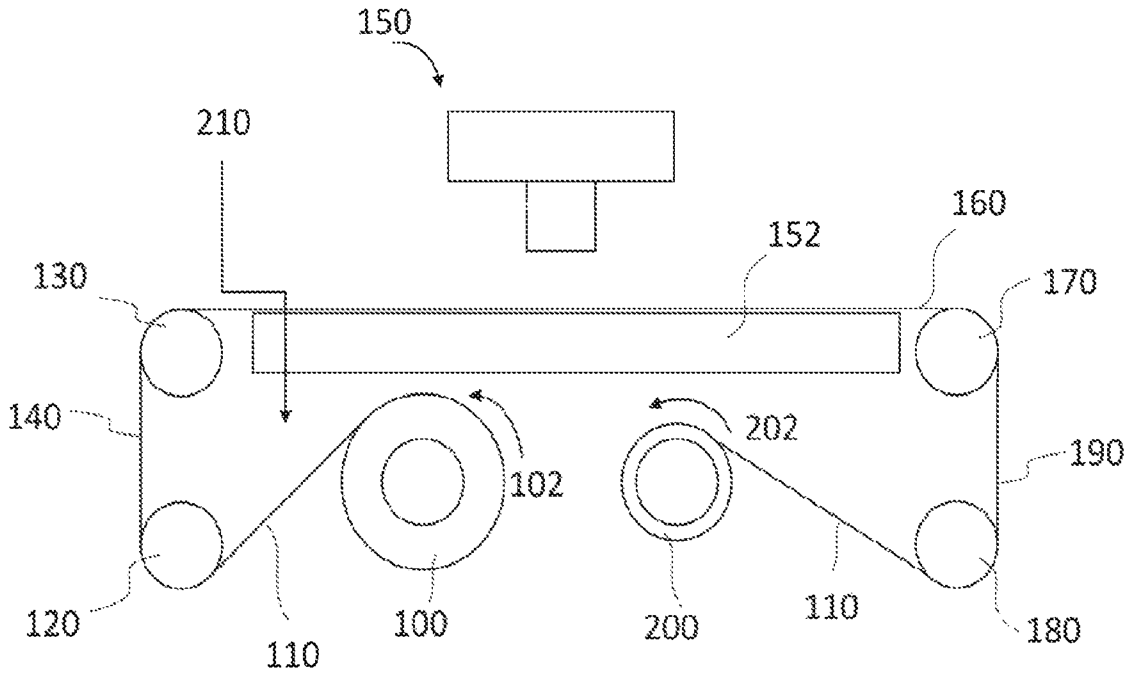
FIGS. 1A and 1B are simplified side view illustrations of a roll-to-roll web processing system constructed and operative in accordance with two alternative preferred embodiments of the present invention.
Figure 1B:
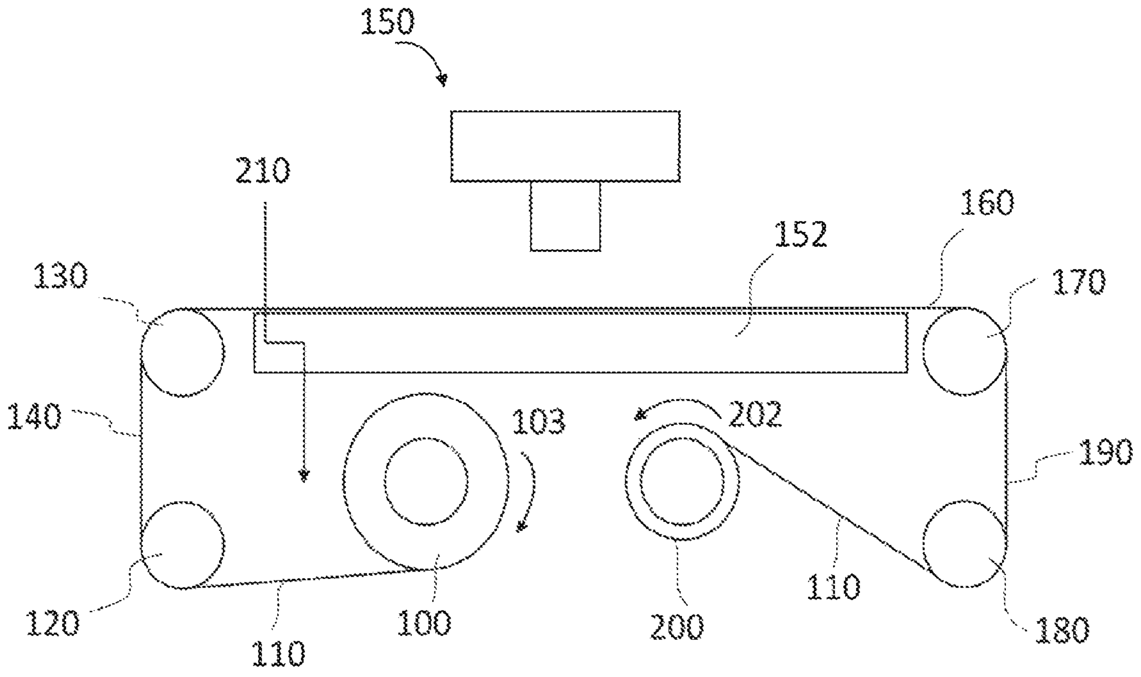
Figure 2:
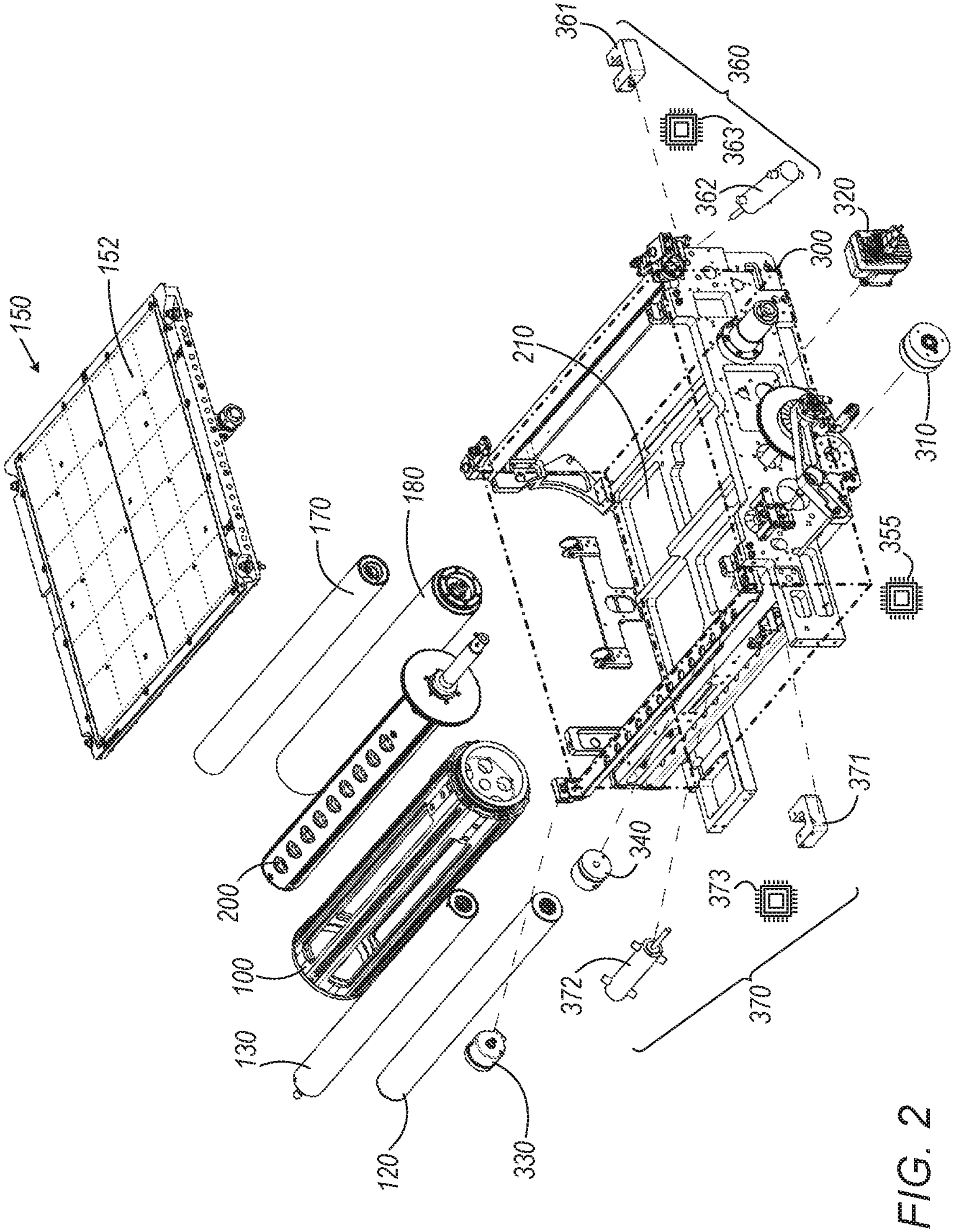
FIG. 2 is a simplified exploded view illustration of the roll-to-roll web processing system of FIGS. 1A & 1B.

Reference is now made to FIGS. 1A and 1B, which illustrate a roll-to-roll web processing system constructed and operative in accordance with two preferred embodiments of the invention. The embodiments of FIGS. 1A and 1B may be identical other than as specifically pointed out below. Reference is also made to FIG. 2, which illustrates the structure of the roll-to-roll web processing system of both FIGS. 1A and 1B.

Preferably, the roll-to-roll web processing system forms part of a flexible PCB production line.

Generally speaking, as seen in FIGS. 1A, 1B and 2, the roll-to-roll web processing system includes a web supply roller 100, operative, when rotated, for supplying web material 110. In the embodiment of FIG. 1A, roller 100 rotates in a direction indicated by reference numeral 102. In the embodiment of FIG. 1B, roller 100 rotates in a direction 103 opposite to direction 102.

The roll-to-roll web processing system also includes at least one upstream intermediate roller, preferably first and second upstream intermediate rollers 120 and 130, for receiving web material 110 from web supply roller 100 and directing the web material 110 along at least a first web pathway portion 140 and a processing subsystem 150, such as a laser processing subsystem and preferably including a vacuum table 152. Alternatively, processing subsystem 150 may be any other suitable processing system, such as a laser drilling subsystem or an inkjet printing subsystem. Vacuum table 152 may be replaced by any other suitable table, such as a slide table. Processing subsystem 150 is preferably arranged along a second web pathway portion 160, angled with respect to the first web pathway portion 140 and preferably extending perpendicularly thereto.

The roll-to-roll web processing system also includes at least one downstream intermediate roller, preferably first and second downstream intermediate rollers 170 and 180, for receiving web material 110 from processing subsystem 150 and directing the web material 110 along a third web pathway portion 190, angled with respect to said the second web pathway portion 160 and preferably perpendicular thereto and a web take up roller 200 operative, when rotated in a second direction of rotation, indicated by an arrow 202, for taking up the web material 110.

It is appreciated that second direction of rotation 202 may be identical to the first direction, such as direction 102 in FIG. 1A, or may be in a direction opposite to the first direction, such as direction 103 in FIG. 1B. It is further appreciated that both first and second directions may be either in a clockwise or counter-clockwise direction.

It is a particular feature of an embodiment of the present invention that the first, second and third web pathway portions 140, 160 and 190, respectively, at least partially delimit a generally rectangular shaped internal volume 210 interior of rollers 120 and 130, processing system 150 and rollers 170 and 180 and that the web supply roller 100 and the web take up roller 200 are located inside internal volume 210.

Turning now particularly to FIG. 2, it is seen that the roll-to-roll web processing system of FIGS. 1A, 1B and 2 is preferably supported on a rigid chassis 300, onto which are mounted rollers 100, 120, 130, 170, 180 and 200 as well as vacuum table 152 of processing subsystem 150, such that the internal volume 210 is a generally rectangular internal volume. Interior volume 210 is indicated in dashed lines in FIG. 2.

Web supply roller 100 is preferably a Tidland expansion shaft commercially available from Maxcess International, Inc of Oklahoma City, Oklahoma (http://www.maxcessintl-.com/core-shafts/tidland-great-expansion-shaft) and equipped with a clutch 310, such as magnetic particle clutch, preferably commercially available from Maxccess (http://www.maxcessintl.com/magnetic-particle-clutches-and-brakes). Rotation of web supply roller 100 in direction 102 or 103 is produced by pulling web material 110 therefrom as the result of rotation in direction 202 of web take up roller 200, which rotation is driven by a motor 320, preferably a stepper motor of a servo motor. Web take up roller 200 is preferably an expansion shaft commercially available from Maxcess International, Inc (http://www.maxcessintl.com/core-shafts/tidland-great-expansion-shaft).

Web material 110 may be any suitable web material, such as Flexible PC (FPC) material (e.g copper clad laminated PI (polyimide) film or PET (polyester) film). Preferably, the web material 110 is a flexible PCB substrate. Intermediate rollers 120, 130, 170 and 180 are preferably live or dead idler rollers commercially available from Maxcess International, Inc (http://www.maxcessintl.com/webex-all-products.

Upstream intermediate roller 120 and 130 is preferably operatively associated with load cells 330 and 340, which cooperate with a clutch 310 and are controlled by a controller 355. Clutch 310, load cells 330 and 340 and controller 355 are collectively referred to as a web material tension control sub-system, which is preferably commercially available from Maxcess International, Inc (http://www.maxcess-intl.com/tension-and-torque-controls/magpowr-cygnus-tension-control). Typically, the roll-to-roll web processing system also includes a web material alignment control sub-system 360, including a sensor 361, an actuator 362 and a controller 363, and a web material alignment control sub-system 370, composed of a sensor 371, an actuator 372 and a controller 373. Web material alignment control sub-systems 360 and 370 are preferably commercially available from Maxcess International, Inc (http://www.maxcessintl-.com/fife).

Web material alignment control sub-systems 360 is preferably operatively associated with downstream intermediate roller 170. Web material alignment control sub-systems 370 is preferably operatively associated web supply roller 100 and with upstream intermediate rollers 120 and 130, so that they are mutually aligned.

It will be appreciated by persons skilled in the art that the present invention is not limited by what has been particularly shown and described hereinabove and in the drawings, rather the invention includes both combinations and sub-combinations of various features described herein as modifications thereof which are not in the prior art.

The invention claimed is:

1. A roll-to-roll web processing system comprising:

a web supply roller operative, when rotated in a first direction of rotation, for supplying web material;

at least one upstream intermediate roller for receiving said web material from said web supply roller and directing said web material along at least a first web pathway portion;

a processing subsystem arranged along at least a second web pathway portion, angled with respect to said first web pathway portion;

a vacuum table arranged along the second web pathway portion opposite from said processing subsystem;

at least one downstream intermediate roller for receiving said web material from said processing subsystem and directing said web material along a third web pathway portion, angled with respect to said second web pathway portion; and a web take up roller operative, when rotated in a second direction of rotation, for taking up said web material, said first, second and third web pathway portions at least partially delimiting an internal volume interior of said at least one upstream intermediate roller, said processing subsystem and said at least one downstream intermediate roller; and said web supply roller, said vacuum table, and said web take up roller being located in said internal volume.

2. The roll-to-roll web processing system according to claim 1 and wherein said roll-to-roll web processing system forms part of a flexible printed circuit board (PCB) production line.

3. The roll-to-roll web processing system according to claim 2 and wherein said web material is a flexible PCB substrate.

4. The roll-to-roll web processing system according to claim 1 and wherein said web take up roller is driven by a motor.

5. The roll-to-roll web processing system according to claim 4 wherein said motor is a stepper motor or a servo motor.

6. The roll-to-roll web processing system according to claim 1 and wherein said web supply roller is passive and is operatively associated with a clutch.

7. The roll-to-roll web processing system according to claim 1 and also comprising a web material tension control sub-system.

8. The roll-to-roll web processing system according to claim 7 and wherein said web material tension control sub-system comprises a clutch, at least one load cell and a controller.

9. The roll-to-roll web processing system according to claim 1 and also comprising at least one web material alignment control sub-system.

10. The roll-to-roll web processing system according to claim 9 and wherein said at least one web material alignment control sub-system comprises a sensor, an actuator and a controller.

11. The roll-to-roll web processing system according to claim 1 and wherein said at least one upstream intermediate roller comprises first and second upstream intermediate rollers.

12. The roll-to-roll web processing system according to claim 11 and wherein said first and second upstream intermediate rollers define said first web pathway portion therebetween.

13. The roll-to-roll web processing system according to claim 1 and wherein said second web pathway portion is perpendicular to said first web pathway portion.

14. The roll-to-roll web processing system according to claim 1 and wherein said at least one downstream intermediate roller comprises first and second downstream intermediate rollers.

15. The roll-to-roll web processing system according to claim 14 and wherein said first and second downstream intermediate rollers define said third web pathway portion therebetween.

16. The roll-to-roll web processing system according to claim 15 and wherein said third web pathway portion is perpendicular to said second web pathway portion.

17. The roll-to-roll web processing system according to claim 1 wherein the processing subsystem is a laser processing subsystem.

18. The roll-to-roll web processing system according to claim 1 wherein the first direction of rotation and the second direction of rotation are opposite of each other.

* * * * *